Aug. 26, 1924.

A. DOWRELIO

AUTOMATIC HOSE REEL

Filed Feb. 11, 1924

INVENTOR
ANTONE DOWRELIO

BY Dewey, Strong, Townsend & Loftus
ATTYS.

Aug. 26, 1924.
A. DOWRELIO
AUTOMATIC HOSE REEL
Filed Feb. 11, 1924    2 Sheets-Sheet 2
1,506,517
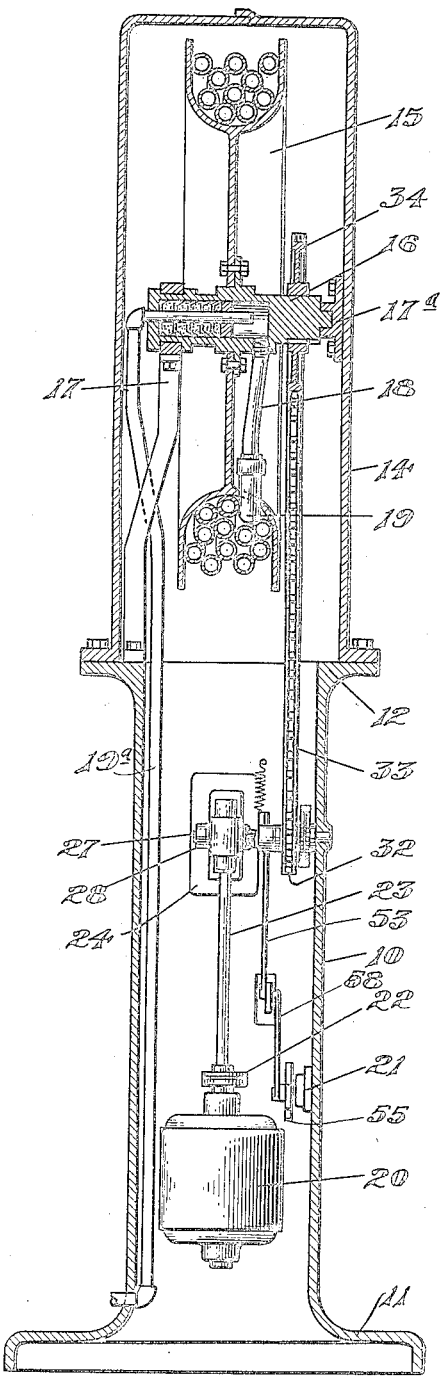
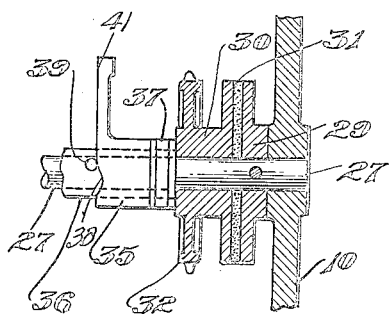
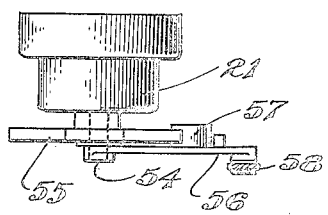
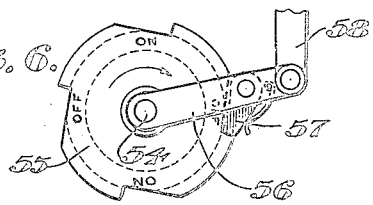
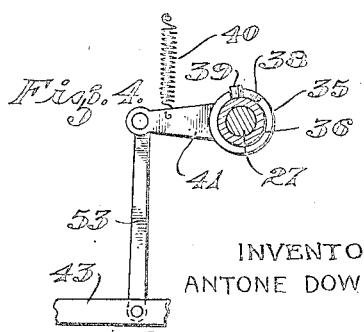
INVENTOR
ANTONE DOWRELIO
BY Dewey, Strong, Townsend & Loftus
ATTYS.

Patented Aug. 26, 1924.

1,506,517

UNITED STATES PATENT OFFICE.

ANTONE DOWRELIO, OF CROCKETT, CALIFORNIA.

AUTOMATIC HOSE REEL.

Application filed February 11, 1924. Serial No. 691,979.

*To all whom it may concern:*

Be it known that I, ANTONE DOWRELIO, a citizen of the United States, residing at Crockett, county of Contra Costa, and State of California, have invented new and useful Improvements in Automatic Hose Reels, of which the following is a specification.

This invention relates to automatic hose reels and particularly pertains to certain improvements on the device disclosed in my prior application entitled "Automatic hose reel," filed June 19, 1923, Serial No. 646,422.

In general, the device referred to comprises a frame structure supporting a drum around which a hose is reeled and a driving motor which is operatively connected to the drum for rotating it in a direction tending to reel up the hose. The motor and the connection between it and the drum are automatically controlled by a mechanism connected with the hose. The connection mentioned is normally ineffective whereby when a pull is exerted on the hose the motor and its connection to the drum will be maintained inoperative so that the hose may be easily unreeled by manual effort. Immediately the hose is released by the user and becomes slack a driving connection will be established between the motor and the drum and the motor will automatically commence operating to drive the drum and thereby reel up the hose.

In this prior device when the hose was unreeled it was necessary to maintain it taut to maintain the motor and driving mechanism ineffective.

It is the principal object of the present invention to equip devices of the character referred to with improved controlling means whereby the driving mechanism will be ineffective when the hose is unreeled but may be rendered effective by exerting a pull on the hose.

One form which the invention may assume is exemplified in the following description and illustrated by way of example in the accompanying drawings, in which:

Fig. 2 is a vertical section through the apparatus taken on line 2—2 of Fig. 1.

Fig. 3 is an enlarged fragmentary view in section through the clutch mechanism.

Fig. 4 is a fragmentary view in side elevation of the clutch showing the shifting collar.

Figs. 5 and 6 are views in plan and elevation, respectively, of the controlling switch, in the circuit of the driving motor of the apparatus.

Figure 1:
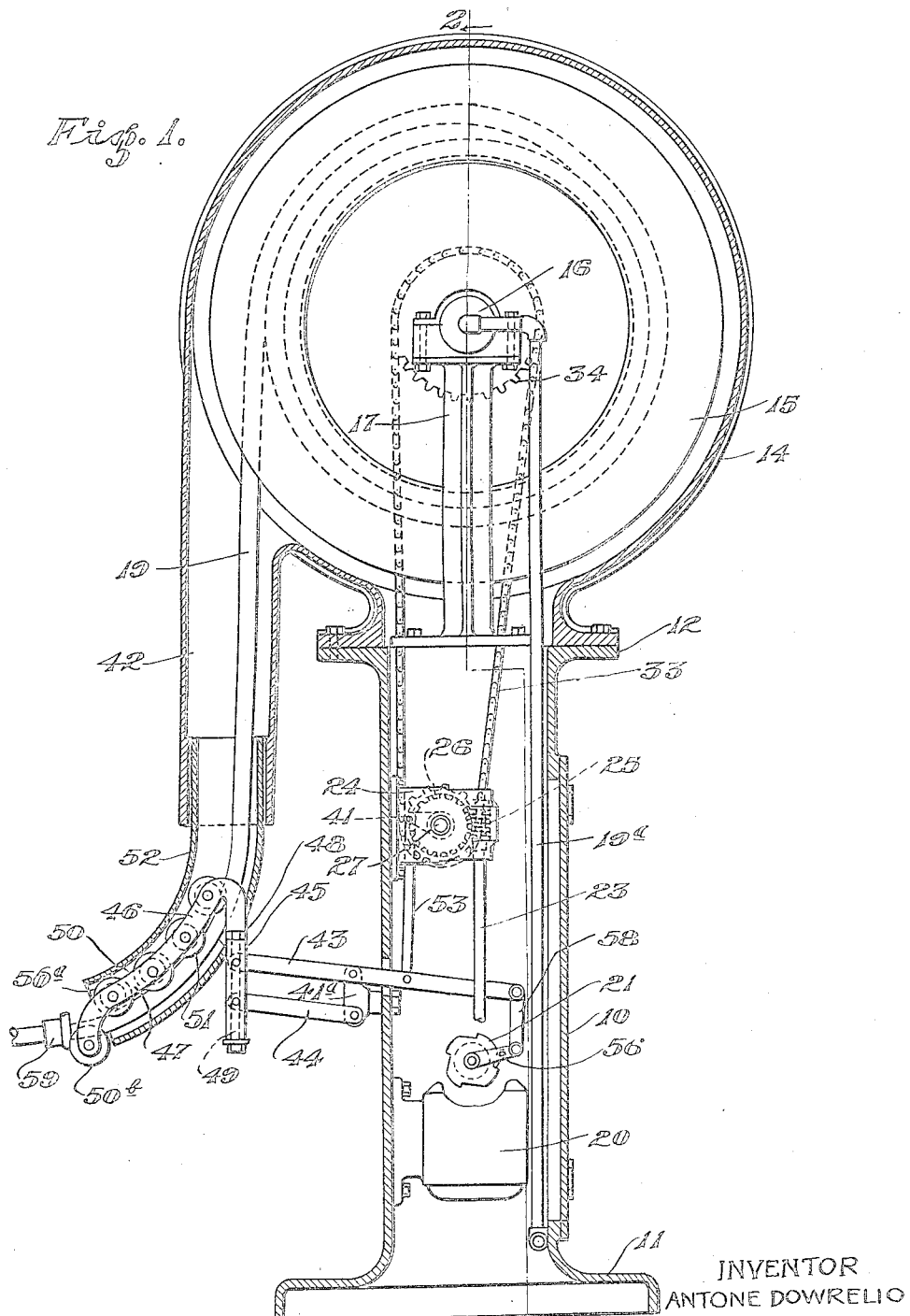
Fig. 1 is a view in side elevation of an apparatus embodying the preferred form of the invention with the casing in section.

Referring more particularly to the accompanying drawings, 10 indicates a base formed with a foot flange 11 and an upper flange 12. Supported by the latter is a casing 14 which encloses a winding drum or sleeve 15. This drum is fitted with a hollow trunnion 16 journalled at its ends in bearings 17 and 17ª. A pipe 18 is connected with the trunnion 16 and extends to a point adjacent the rim of the drum where it connects with one end of a hose 19 wound on the drum. The pipe 18 constitutes a fluid connection between the interior of the trunnion and the boss. To supply fluid to the interior of the trunnion 16 one end of a fluid supply pipe 19 projects into the interior of the trunnion, as shown in Fig. 2. The other end of this pipe is connected with a suitable source of fluid supply.

Mounted in the base 10 is an electric driving motor 20, the circuit of which is controlled by a rotary snap switch of standard design. The shaft of the motor 20 is connected by a flexible coupling 22 to a worm shaft 23. This shaft is journalled in a subframe 24 secured within the base above the motor. The worm shaft 23 is fitted with a worm 25 which meshes with a worm gear 26 fixed on a jack shaft 27. This shaft is also journalled in the subframe 24.

Reference being had to Fig. 2, it is seen that the outer end of the jack shaft is fitted with a fixed collar 28. The other end of this shaft is fitted with a friction clutch comprising a disk 29 fixed on the shaft, a movable disk 30 and a leather friction disk 31 interposed between the disks 29 and 30. The hub of the movable disk is fitted with a sprocket gear 32 which is connected by an endless chain 33 to a sprocket 34 fixed on the trunnion 16 of the drum 15. When the motor is in operation and the clutch is engaged the motor will rotate the drum at a comparatively slow speed in a direction tending to reel up the hose on the drum or in the direction indicated by the arrow in Fig. 1.

To control the clutch, a clutch shifting collar 35 is mounted on the reduced end 36 of one of the jack shaft bearings on the subframe. This collar bears against a thrust bearing 37 which in turn bears against the hub of the movable clutch disk 30. One face of the collar 35 is formed with a cam recess 38 which is adapted to be engaged by a fixed pin 39 secured to the bearing 36 and when the collar is turned in one direction the pin will cause it to move axially and thereby shift the movable clutch disk and engage the clutch. The collar 35 is normally maintained in a position holding the clutch engaged by a tension spring 40 which is connected to the base 10 and to the outer end of an arm 41 extending from the collar 35.

It is intended that the clutch and motor be controlled by the hose. To accomplish this I secure a rigid bracket 41$^a$ to the exterior of the base 10. This bracket pivotally supports a pair of parallel horizontal levers 43 and 44. The outer ends of these levers pivotally connect to a vertical sleeve 45. This sleeve supports a hose guide 46 which comprises a pair of parallel flat members 47. These members are connected at one end by a spacer 48 which is positioned at the top of the sleeve 45 and pivoted thereto by a vertical pivot bolt 49. This mounting permits the hose guide to be swung horizontally to any desired position. The members 47 are bent in somewhat of a V-shape and with their longer portions 50 constituting bearings for rollers 51. These rollers are formed with concave peripheries. The hose is preferably passed between the lower two rollers 50$^a$ and 50$^b$ as shown in Fig. 1.

For the sake of appearance it is desirable to enclose the members 47 and the rollers supported thereby in a tubular casing 52. The upper end of this tubular casing 52 is slidably mounted within the downwardly extending sleeve 42 formed on the casing 14. The inner end of the lever 43 connects with a link 53 which in turn is connected to the arm 41 on the clutch shifting collar 35 so that vertical movement of the hose guide will operate the clutch.

To control the operation of the motor I mount the rotary snap switch 21 in the base 10 adjacent the motor. The spindle 54 of this switch is fitted with a ratchet wheel 55 and with a pivotal lever arm 56. The latter carries a spring-pressed pawl 57 for cooperation with the ratchet wheel. The outer end of the lever 56 is connected to the inner end of the lever 43 by a link 58. The snap switch at each quarter revolution alternately opens and closes the circuit through the motor. It is intended that upward movement of the hose guide rotate the ratchet wheel 45 in the direction of the arrow shown in Fig. 6 one quarter of a revolution at each operation, thus alternately opening and closing the switch.

In operation of the device, assuming that the hose is fully wound on the drum and that a stop member 59 at the end of the hose has engaged the rollers 50$^a$ and 50$^b$ of the hose guide so as to raise the latter to its uppermost position to maintain the clutch disengaged. When it is desired to unreel the hose a pull exerted thereon will maintain the hose guide in its uppermost position. This will hold the clutch mechanism disengaged so that continued pull on the hose will revolve the drum and unreel the hose. During this operation the switch will be in open position and the motor will remain idle. When the hose is released by the user and becomes slack, the hose guide 46 will lower by gravity. Although this movement of the hose guide will engage the clutch, the switch of the motor will not be actuated, as only upward movement of the hose guide affects the operation of the switch. Consequently the hose will remain unreeled.

When it is desired to reel up the hose a pull is exerted thereon to raise and lower the hose guide 46. During the upward movement of the hose guide the lever 44 will swing the lever 56 downwardly and impart a quarter revolution to the ratchet wheel 55 through the pawl 57. This will close the switch and start the motor. When the hose guide 46 has been raised and the hose released by the user the hose guide will lower by gravity. This will impart a turning movement to the shifting collar 35 through the lever 43, the link 53 and the arm 41, and will cause the collar to shift axially through the medium of the pin 39 and the cam recess 38 and engage the clutch.

When the hose has been fully reeled the stop member 59 which is fixed at the free end of the hose will engage the rollers 50$^a$ and 50$^b$ of the hose guide. This causes the movement of the hose to raise the hose guide and thereby actuate the switch to open the motor circuit and stop the motor.

The pipe 19$^a$ may be connected with any suitable source of fluid under pressure. This pipe will deliver the fluid to the interior of the trunnion 16 and thence the pipe 18 to the hose. A nozzle may be fitted to the free end of the hose to control the flow of fluid therethrough.

From the foregoing it is obvious that a desirable hose reel has been provided which will be efficient in operation.

While I have shown the preferred embodiment of the invention as now known to me, it is to be understood that various changes in its construction may be made without departing from the invention as defined in the appended claims.

Having thus described my invention, what I claim and desire to secure by Letters Patent is:

1. An automatic hose reel comprising a frame, a drum rotatably supported thereby, a hose reeled on said drum, a driving motor carried by the frame and operatively connected to said drum for driving the same in a direction tending to reel said hose on the drum, a normally open switch in the circuit of said motor, a movable hose guide through which the hose is led, said hose guide being adapted to be operated by said hose, said hose guide being operatively connected to said switch whereby successive movements of the hose guide in one direction caused by tension being placed on the hose will successively close and open said switch.

2. An automatic hose reel comprising a frame, a drum rotatably supported thereby, a driving motor carried by the frame, and operatively connected to said drum for driving the same in a direction tending to reel said hose upon the drum, a normally open switch in the circuit of said motor, a vertically movable hose guide through which the hose is led, said hose guide being adapted to be operated by the hose, a clutch in the connection between the motor and the drum, said hose guide being operatively connected to said clutch and said switch whereby movement of the hose in one direction will alternately close and open said switch and movement in the other direction will engage said clutch.

3. An automatic hose reel comprising a frame, a drum rotatably supported thereby, a hose reeled on said drum, an electric motor carried by the frame, a normally open rotary switch controlling said motor, an operative connection between said motor and said drum, a normally disengaged clutch in said connection, a lever pivoted to the frame, a hose guide pivotally connected to one end of said lever and through which the hose is led, an operative connection between the other end of the lever and said clutch and said switch whereby vertical movement of the hose guide will operate said clutch and said switch, said guide being adapted to be actuated by the hose, and when moved in one direction to close said switch and when moved in the other direction to cause engagement of the clutch.

4. An automatic hose reel comprising a frame, a drum, hose wound upon said drum, an electric driving motor for operating said drum, a vertically movable hose guide through which the hose is led, a rotary switch in the circuit of said motor, a ratchet wheel fixed on the spindle of said switch, an arm pivoted on said spindle and carrying a pawl for cooperation with said ratchet wheel, and a connection between said arm and said hose guide whereby movement of the latter in one direction will actuate the switch.

5. An automatic hose reel comprising a frame, a drum, hose wound on said drum, an electric driving motor operatively connected to said drum, a horizontally disposed lever pivoted to the frame, a hose guide pivoted to one end of said lever, said hose being led through said guide for actuating the same, a rotary switch in the circuit of said motor, a ratchet wheel fixed on the spindle of said switch, an arm pivoted on said spindle and carrying a pawl for cooperation with said ratchet wheel, a clutch in the connection between the motor and the drum, and a connection between said lever and the clutch and arm whereby movement of the hose guide in one direction will actuate the switch and in the opposite direction will engage the clutch.

ANTONE DOWRELIO.